United States Patent
Aebi (12)

(10) Patent No.: US 6,524,635 B1
(45) Date of Patent: Feb. 25, 2003

(54) COATED CANDY PRODUCTS

(75) Inventor: Marcel Aebi, Dublin, OH (US)

(73) Assignee: Nestec S.A., Vevey (CH)

(*) Notice: Subject to any disclaimer, the term of this patent is extended or adjusted under 35 U.S.C. 154(b) by 347 days.

(21) Appl. No.: 09/615,806

(22) Filed: Jul. 13, 2000

(51) Int. Cl.[7] .................................................. A23G 3/00
(52) U.S. Cl. ...................... 426/103; 426/305; 426/306; 426/660
(58) Field of Search ............................... 426/103, 305, 426/306, 660

(56) References Cited

U.S. PATENT DOCUMENTS

| | | | | |
|---|---|---|---|---|
| 2,946,689 A | * | 7/1960 | Pikal | 426/102 |
| 3,580,188 A | * | 5/1971 | Lutsey | 426/102 |
| 4,189,289 A | * | 2/1980 | Getman | 425/93 |
| 4,822,627 A | | 4/1989 | Clegg et al. | 426/101 |
| 4,888,187 A | | 12/1989 | Given, Jr. et al. | 426/102 |
| 5,004,620 A | * | 4/1991 | Straight et al. | 426/304 |
| 6,033,702 A | | 3/2000 | Pedersen et al. | 426/289 |
| 6,200,612 B1 | * | 3/2001 | Spector | 426/102 |

FOREIGN PATENT DOCUMENTS

| | | |
|---|---|---|
| BE | 1009620 | 6/1997 |
| WO | WO 97/28697 | 8/1997 |

OTHER PUBLICATIONS

"Chocolate, Cocoa and Confectionery", Bernard W. Minifie, Third Edition, 1989, Chapman & Hall, p. 221.*

* cited by examiner

Primary Examiner—Nina Bhat
(74) Attorney, Agent, or Firm—Winston & Strawn

(57) ABSTRACT

A process for preparing a candy product with a fat-based coating having embedded therein at least one edible object by coating a candy base with a fat-based coating, softening the fat-based coating, embedding the at least one edible object in the fat-based coating and hardening the fat-based coating.

18 Claims, No Drawings

COATED CANDY PRODUCTS

FIELD OF THE INVENTION

The present invention relates to a process for preparing a candy product comprising a candy base with a fat-based coating having embedded therein at least one edible object.

BACKGROUND OF THE INVENTION

Enrobed and dipped candy products and frozen products such as ice cream are known having edible objects embedded in their coatings, e.g., nuts, crumbs, fruit bits, raisins, chocolate chips, rice cereals, granola. Traditionally, these edible objects are mixed into the enrobing or dipping mass before the centerpiece is covered with such mass. If the mass were not fast hardening, the edible objects would have a tendency to run off onto the slopes of the coated product. To avoid the runoff of the edible objects during the enrobing or dipping process, double enrobing is usually carried out with the edible objects being sprinkled in between the layers. In any case, large proportions of the edible objects are covered by the coating and are not exposed for the enjoyment of shape and color.

Goods with fat based coatings produced in revolving pans are covered by building up the layers little by little with the layer being cooled and hardened between each application. These processes do not allow for enough adhesion to add edible objects, which subsequently will be embedded into the coating.

Once the fat based coatings are established, the problem with panned fat-based coatings is that the coating is too hard to embed edible objects therein.

SUMMARY OF THE INVENTION

We have devised a process for embedding edible objects in a fat-based coated candy, which method enables enhancement of the product, either visually, in texture or in flavor characteristics.

According to the present invention, there is provided a process for preparing a candy product with a fat-based coating having embedded therein at least one edible object. This process comprises coating a candy base with a fat-based coating, softening the fat-based coating, embedding the at least one edible object in the softened fat-based coating, and hardening the fat-based coating to maintain the edible object(s) therein.

DETAILED DESCRIPTION OF THE INVENTION

The candy base may be of any material and shape suitable for panning, for instance, a hard-boiled sweet, caramel, nougat, cream, paste, fondant dried fruit, nut, cereal, cookie or bread based.

The fat-based coating may be any suspension of an edible solid in fat, such as chocolate, or compound or yogurt coatings. The chocolate may be, for instance, dark, milk or white chocolate. The compound coating may include any products derived from sugar with or without milk derived components, and solids from vegetable or cocoa sources in differing proportions suspended in fat or oil in water emulsion having a moisture content less than 10%, more usually less than 5% by weight. The compound coating may also be a coverture that can include chocolate substitutes containing direct cocoa butter replacements, stearines, coconut oil, palm oil, butter or any mixture thereof; nut pastes such as peanut butter and fat; pralines; confectioner's coatings, used for covering ice cream or cakes usually comprising chocolate analogues with cocoa butter replaced by a cheaper non-tempering fat; or a product known in the trade as "Caramac" sold by Nestlé comprising non-cocoa butter fats, sugar and milk.

The fat-based coating may be applied to the candy base on a flowing bed, for instance by a 'panning' process. Panning is a well known process in the chocolate industry and employs a rotating pan or a moving belt forming a pocket, in which the centers flow, roll and cascade over one another. The fat-based coating may be applied in melted form by hand or spray during rotation and is set by cooling air applied to the product bed as it flows. In this way, layers of fat-based coating are built up around the center to any desired thickness and the shape of the final article approximates that of the center and is usually quite smooth. A polish or glaze may be finally applied. Panning is described in detail in "Chocolate, Cocoa, and Confectionery" Bernard W. Minifie, Third Edition, 1989, Chapman & Hall, pages 221–223.

The fat-based coating applied to the candy base should have a thickness appropriate to embed the at least one edible object. The thickness of the coating layer is preferably equal to or thicker than the thickness of the object embedded. A coating thickness of less than the thickness of the embedded object is possible and will result in a raised appearance but this can be attractive if so desired.

The fat-based coating is preferably softened sufficiently to be displaceable but not sufficiently to be flowable or pourable, e.g., so that it runs off the center. Preferably, the fat-based coating is softened by heat. The softening temperature is preferably between about 25° C. and 35° C., depending on what coating is being used. Normally, the softening temperature is reached when part of the fat is melted.

The edible object should be of a non-melting nature, i.e., it should have a melting point that is higher than that of the coating used to cover the center. Examples of such materials include decorating materials such as those which are commonly used in cake manufacture or decoration, an encapsulated flavor which optionally may be colored, dried sugar pieces, gums or other gels, coconut pieces, cereal pieces, colored flakes, or nut pieces. These objects can be used alone or in combination.

The size of the object typically depends on the curve (or radius) of the center or final candy surface so that the object(s) properly blend with the candy surface, without appearing to be obtrusive. For some candies, the size should be sufficiently large to provide a visually recognizable appearance of the object.

The edible object is preferably visually or organoleptically different from the candy center. For instance, the edible object may be reflective or have a color, shape, flavor or texture that is different from that of the center of the candy product. The shape may be, for instance, a sphere, cube, circle, star, triangle, square, rectangle, polygon, oval or irregular, non-symmetrical, including cartoon characters, etc. Suitable flavors include mint, fruit such as strawberry, lemon or orange, coffee or cocoa, nutflavors etc. One of ordinary skill in the art has a wide range of materials to select from without departing from the teachings of this invention.

Advantageously, the edible object is embedded in the external surface of the fat-based coating so that at least part of the edible object remains visible on the surface of the product.

The edible object is preferably embedded in the fat-based coating by use of force, e.g., by sprinkling and fixing through the product weight, by accelerating or projecting the object into the fat-based coating or by pressing, such as by a stamping press.

Preferably, there are a plurality of edible objects embedded in the fat-based coating. The number of edible objects embedded may depend on a variety of factors including their size. For example, from 25% to 90% of the candy surface may be covered, and a coverage of approximately 50% to 75% of total candy surface is often desirable. Thus, essentially any number of objects can be included in the final product.

After embedding the at least one edible object in the product, the fat-based coating may be smoothed by friction and preferably hardened by cooling with cold air setting the oils to a temperature below their melting temperatures.

The process of the present invention enables new excitement to the appearance of the product with the addition of new shapes, colors, textures and flavors, thus increasing the appeal of common fat-based pan-coated products.

The present invention also provides a candy product with a fat-based coating having embedded therein at least one edible object as described herein.

EXAMPLE

The following Example further illustrates the present invention.

A pan is loaded with Graham cookie pieces of approximately 1 g each. Milk chocolate, 3 g per piece, is formed into a coating around the Graham cookie pieces and set. The surfaces of the candies are reheated to 27° C. by means of infrared and hot air. A sufficient quantity of brightly colored decorating flakes of about 2 mm in diameter, which were previously tempered to approximate 35° C., is sprinkled on to the conditioned rolling candies. As soon adhesion has taken place, the sequins are rolled into the surface, displacing some of the coating on the candy. The candies are now cooled to 15° C. and a traditional confectionery polish is applied. After a short while of maturing, the candies are ready to be packaged.

What is claimed is:

1. A process for preparing a candy product with a fat-based coating having embedded therein at least one edible object which comprises coating a center or candy base with a fat-based coating, softening the fat-based coating wherein the fat based coating is softened sufficiently to be displaceable but not sufficiently to be flowable or pourable; embedding the at least one edible object in the fat-based coating, and hardening the fat-based coating.

2. A process according to claim 1 wherein the fat-based coating is a suspension of an edible solid in fat.

3. A process according to claim 1 wherein the fat-based coating is chocolate, a compound coating, or a yogurt.

4. A process according to claim 1 wherein the fat-based coating is applied to the center or candy base from a flowing bed.

5. A process according to claim 1 wherein the fat-based coating is applied to the center or candy base by a panning process.

6. A process according to claim 1 wherein the fat-based coating applied to the candy base has a thickness appropriate to embed the at least one edible object therein.

7. A process according to claim 1 wherein the fat based coating is softened by heat.

8. A process according to claim 7 wherein the fat-based coating is a chocolate and is softened by heating to about 25° C. and 35° C.

9. A process according to claim 1 wherein the at least one edible object is visually, texturally or organoleptically different from the center or candy base.

10. A process according to claim 1 wherein the at least one edible object is reflective.

11. A process according to claim 1 wherein at least one edible object has a color, shape, flavor or texture that is different from the center or candy base.

12. A process according to claim 1 wherein the at least one edible object is embedded in an external surface of the fat-based coating so that at least part of the edible object remains visible on the surface of the candy product.

13. A process according to claim 1 wherein the at least one edible object is embedded in the fat-based coating by the use of a force.

14. A process according to claim 13 wherein the force is provided by sprinkling, pressing, accelerating, or projecting the edible object into the fat-based coating.

15. A process according to claim 1 wherein a plurality of edible objects are embedded in the fat-based coating.

16. A process according to claim 1 wherein the fat-based coating with the at least one edible object embedded therein is hardened by cooling.

17. A process according to claim 1 wherein at least part of the embedded edible object remains visible in the candy product, and the candy product is a solid at a temperature of 15° C.

18. A candy product with a fat-based coating having embedded therein at least one edible object produced by the process of claim 1.

* * * * *